United States Patent [19]

Inoue et al.

[11] Patent Number: 5,030,967

[45] Date of Patent: Jul. 9, 1991

[54] CONSTANT TENSION DEVICE FOR A THERMAL TRANSFER PRINTER

[75] Inventors: Ikutaro Inoue; Yuki Ohishi, both of Iwate; Susumu Asakawa, Tagajo, all of Japan

[73] Assignee: Alps Electric Co., Ltd., Tokyo, Japan

[21] Appl. No.: 378,562

[22] Filed: Jul. 11, 1989

[30] Foreign Application Priority Data

Jul. 11, 1988 [JP] Japan .................................. 63-90975
Jul. 11, 1988 [JP] Japan .................................. 63-90976

[51] Int. Cl.[5] ........................ G01D 15/10; B41J 35/28

[52] U.S. Cl. ............................... 346/76 PH; 400/120; 400/207

[58] Field of Search ........................ 400/234, 120, 207; 346/76 PH

[56] References Cited

U.S. PATENT DOCUMENTS 4,831,387 5/1989 Sakaguchi et al. ............ 346/76 PH

FOREIGN PATENT DOCUMENTS 0126203 11/1984 European Pat. Off. .
0211075 9/1986 Japan .................................. 400/234
0151372 7/1987 Japan .................................. 400/234

*Primary Examiner*—Benjamin R. Fuller
*Assistant Examiner*—Huan Tran
*Attorney, Agent, or Firm*—Guy W. Shoup; Paul J. Winters

[57] ABSTRACT

A constant tension device for peeling an ink ribbon away from a printing medium during a correction operation in which ink printing produced by a thermal transfer printer is erased, a roller mounted on the printer is pressed against another roller mounted on a ribbon cassette, an ink ribbon is trained over the roller mounted on the ribbon cassette and between the two rollers, and the ink ribbon is stretched by the rotation of the roller mounted on the ribbon cassette which is rotated with a constant speed so as to provide a constant tension so that the ribbon is reliably peeled away from the printing medium.

8 Claims, 5 Drawing Sheets

CONSTANT TENSION DEVICE FOR A THERMAL TRANSFER PRINTER

FIELD OF THE INVENTION

This invention relates generally to a thermal transfer printer, which melts ink from an ink ribbon by selective heat production of heat producing elements in a thermal head and effects printing by transferring the melted ink to a sheet of paper, and relates particularly to a device for correcting the printed characters from a thermal transfer printer by properly peeling the correction ribbon, upon which is the ink to be removed, away from the sheet of paper, thereby effecting a correction operation by which the printing on the sheet of paper is removed.

BACKGROUND OF THE INVENTION

A thermal transfer printer which is configured to include a print-correction feature is often found on typewriters. This correction feature allows the removal of unintentionally printed characters.

Thermal transfer printers are generally made up of a printing surface, or platen, an ink ribbon, a thermal head and a printing medium (normally a sheet of paper). The ink ribbon is comprised of a base ribbon upon one side of which is deposited an ink film. During the printing operation, the ink ribbon is disposed between the paper, the thermal head and the platen such that the base ribbon is facing the thermal head, the ink film is facing the paper, and the platen is located on the side of the paper opposite the ink ribbon. When the positioning mechanism of the thermal head is activated during the printing process to move toward the ink ribbon, the ink ribbon and paper are pressed together between the platen and the thermal head. When heat in a predetermined pattern is applied to the ink ribbon from the heating elements on the thermal head, the heat travels through the base ribbon and melts the ink located directly across from the activated heating elements. The molten ink then separates from the ink ribbon and is held between the ink ribbon and the paper. When the heat from the thermal head is removed, the ink cools and solidifies. Because the ink has a greater affinity for the paper than for the ink ribbon, the ink adheres to the paper in the predetermined pattern produced by the heating elements on the thermal head.

Early developed methods to remove a character printed by a thermal printer involve a process similar to the printing described above; however, instead of an ink ribbon, a correction ribbon is used. The thermal head is positioned over a character to be removed and the character is heated. Because the ink has a greater affinity for the correction ribbon than for the paper, the ink adheres to the correction ribbon when the correction ribbon is peeled away from the sheet of paper. The problem with this method, however, is that if the ink does not sufficiently cool and solidify before the correction ribbon is peeled away from the sheet of paper, at least a portion of the ink will be left on the paper.

The problem associated with the method of correcting thermal transfer printing described above is addressed in the prior art by the introduction of a correction pin located next to the thermal head and on the downstream side of the correction ribbon. When a correction was effected, the correction pin extends to press the correction ribbon against the paper such that when the thermal head is moved away from the position in front of the corrected character, the ribbon remains pressed against the paper, allowing the ink to cool and solidify. Once the ink cools and adheres to the correction ribbon, the correction pin is removed and the correction ribbon is peeled away from the paper, thereby removing the character from the paper.

A problem still remains with the correction pin method of ink removal. When the ink cools and solidifies, it adheres to both the paper and the correction ribbon. Because the ink has a stronger affinity for the correction ribbon than for the paper, when the correction ribbon is peeled away with sufficient force from the paper, the ink is separated from the paper. However, if the force peeling the ribbon away from the paper is not sufficient, the ink acts as a glue and the ribbon becomes adhered to the paper. When printing or correcting process is continued, the correction ribbon becomes fouled and damage to the ribbon results.

Ink and correction ribbons are usually enclosed within a ribbon cassette which provides both protection for the ribbons and a convenient method of replacing or exchanging ribbons on the thermal transfer printer. The cassettes are generally made up of a housing in the shape of a thin rectangular box. The ribbon is unwound from a supply reel and, as it is used, is rewound onto a take-up reel. The exposed portion of the ribbon, located between the supply reel and the take-up reel, is positioned by the cassette housing such that when the cassette is connected to the thermal transfer printer, the exposed portion is disposed between the printer head and the paper.

The method of transferring ribbon from the supply reel to the thermal head and finally to the take-up reel involves the use of a motor connected to the take-up reel. When the motor is activated, force is applied to the take-up reel such that the ribbon is drawn to and wound around the take-up reel. This action results in tensile force along the exposed portion of the ribbon and also causes the ribbon to unwind from the supply reel.

The prior art correction pin method relied upon the motor driving the take-up reel to provide the necessary force to peel the correction ribbon containing the ink from the paper when the correction pin was withdrawn. The problem associated with this prior art method was that the tensile force exerted on the ribbon varied with the amount of ribbon already removed onto the take-up reel. As the take-up reel accumulated ribbon, the amount of tensile force exerted on the ribbon decreases. This decrease in tensile force can result in insufficient force to peel the ink from the paper and ribbon fouling can result.

In addition to correction operations involving black ink, certain thermal transfer printers capable of printing in different colors from a single ribbon are benefitted by this constant tension device. Because printing in different colors on these thermal transfer printers involves detecting the color of the ink in front of the print head, it is important to keep the color ink ribbon taut and moving at a constant rate at the time of detection. In these color thermal transfer printers, the method of providing the tension along the color ink ribbon and controlling the ribbon feed rate is similar to the black-ink-ribbon thermal transfer printers; that is, the take-up reel is provided a nonvarying torque to draw the ribbon from the supply reel. The varying tension and feed rate caused by various amounts of color ink ribbon on the take-up reel make color detection unreliable.

OBJECT OF THE INVENTION

One object of this invention is to provide a device for effecting correction of characters printed by a thermal transfer printer which avoids the problems associated with the prior art method described above and is capable of reliably removing the characters from the paper onto a correction ribbon. A second objective of this invention is to provide improved means for reliably detecting the color of ink on a color ink ribbon.

SUMMARY OF THE INVENTION

As discussed above, one problem associated with the correction of ink characters left by a thermal transfer printer is to supply a sufficient peeling force to the correction ribbon in order to reliably break the bond of the ink with the paper. It has been discovered that the prior art design of ribbon cassettes incorporating the peeling method described above is inadequate to reliably remove ink in the correction process. It has also been discovered that providing tensile force to the exposed portion of the correction ribbon which does not vary with the amount of ribbon on the take-up reel provides a successful method of curing this problem. Finally, this constant tension device also provides improved means for reliable color detection in a color-ink-ribbon thermal transfer printer by providing a constant tension along the color ink ribbon and a constant feed rate, thereby aiding the color detecting means.

DETAILED DESCRIPTION

Figure 3:
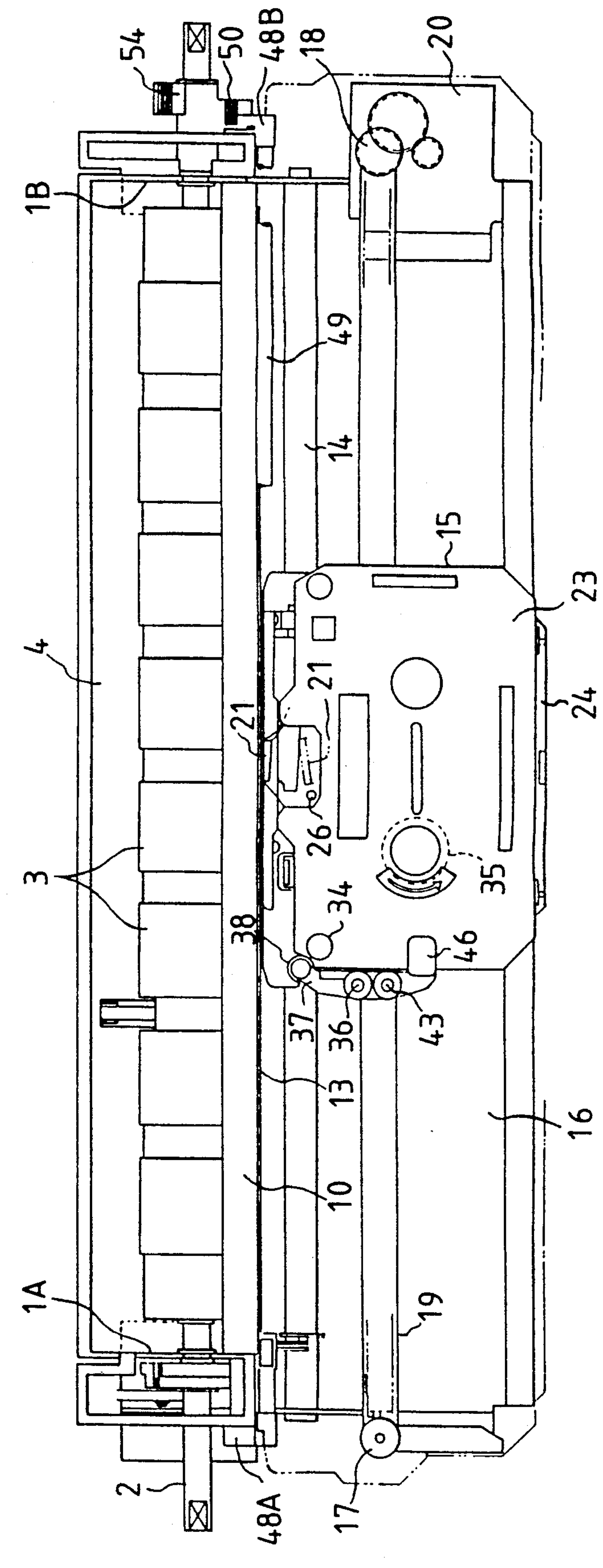
FIG. 3 is a plan view illustrating the principle part of a thermal transfer printer to which this invention applies.
Figure 4:
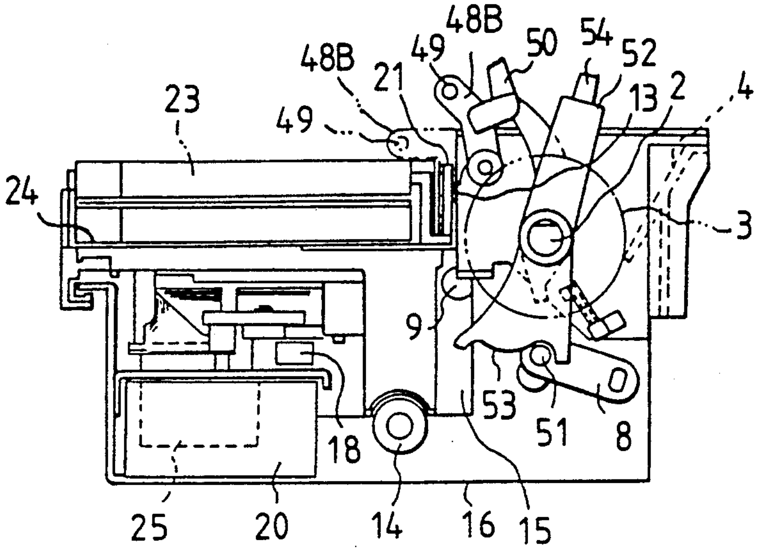
FIG. 4 is a side view of the principle part of the thermal transfer printer indicated in FIG. 3.
Figure 5:
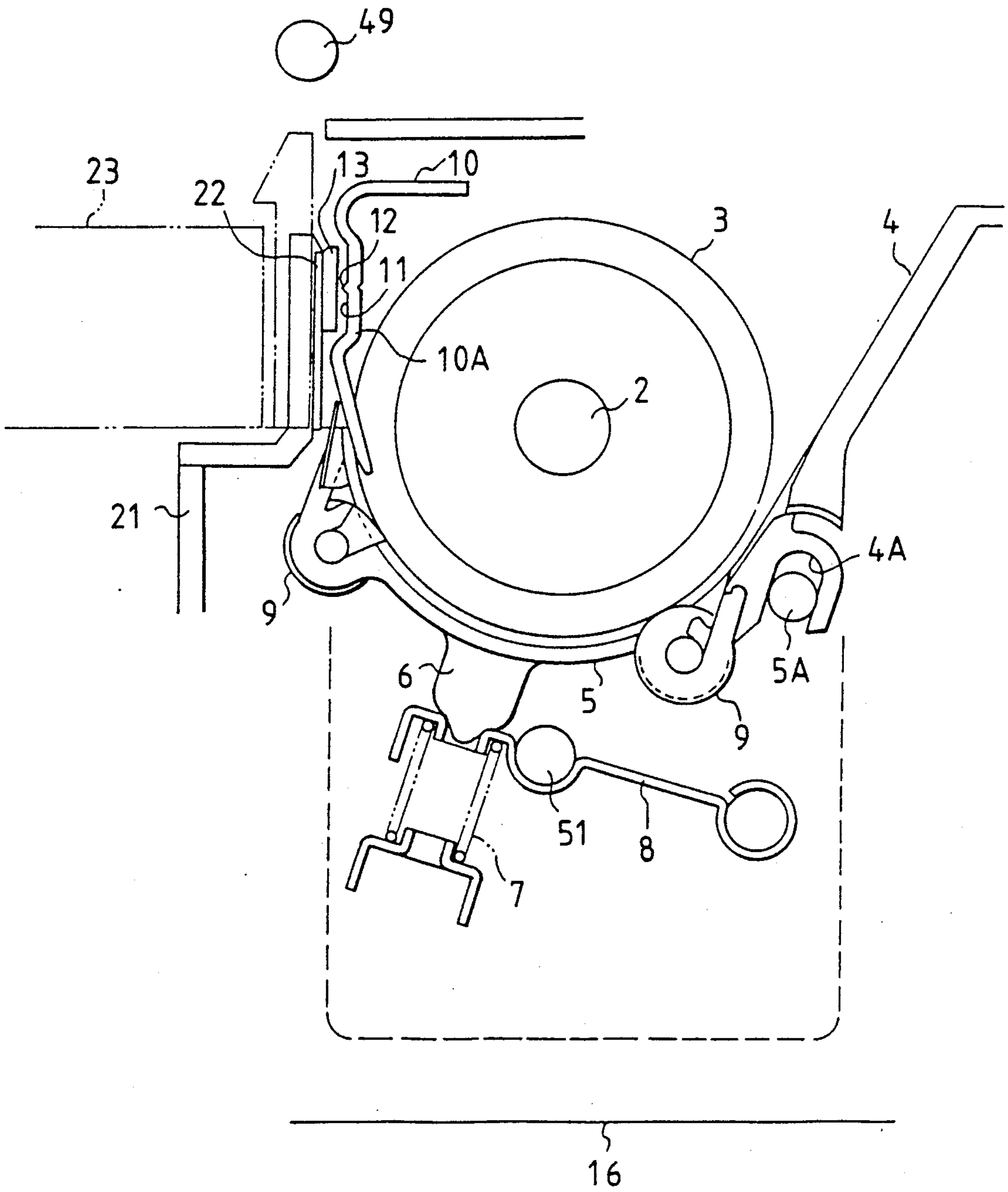
FIG. 5 is a partial cross-sectional view illustrating the principal part of the thermal transfer printer indicated in FIG. 4 in an enlarged scale.

FIGS. 3 to 5 show a thermal transfer printer, to which the constant tension device according to this invention is applied. It is assumed that this thermal transfer printer is used in conjunction with a typewriter; therefore, this thermal transfer printer receives print instructions from a keyboard and can affect a correction operation in the event of a typing error.

As shown in FIG. 3, supported between the left and right frames 1A and 1B of the thermal transfer printer is a rotating shaft 2 driven by a motor (not shown). A plurality of gum rollers 3, 3, . . . are spaced in the axial direction along the rotating shaft 2. As shown in FIG. 5, a fixed guiding member 4 for inserting a sheet of paper (not shown) is disposed behind and inclined under the gum rollers 3. Further, located under gum rollers 3, a movable guide member 5 having an arc-shaped cross-section is disposed movably in the radial direction toward or away from the rotating shaft 2. Movable guide member 5 may be moved toward or away from the gum rollers 3 because a guide pin 5A protruding from the movable guide member 5 slides in a guide groove 4A formed in guide plate 4. On the rear side surface of movable guide member 5 is disposed a holder 6 protruding therefrom. Against this holder 6 a lever 8 energized by a spring 7 is contacted and provides an enabling means for the movement of movable guide members 5 close to and away from gum rollers 3. Furthermore, on movable guide member 5, a pair of forwarding rollers 9 having a small diameter are supported rotatably. Forwarding rollers 9 are spaced along movable guide member 5 and are situated such that when movable guide member 5 is close to gum rollers 3, forwarding rollers 9 are in contact with gum rollers 3. Consequently, the movable guide member 5 is held away from the outer periphery of the gum rollers 3 at an extremely small distance by opposing forces caused by the elastic force of the spring 7 against the combination of the guide pin 5A pressing against guide groove 4A and the forwarding rollers 9 pressing against gum rollers 3.

Shown in FIG. 5, a platen base plate 10 extending in the horizontal direction and having an approximately L-shaped cross-section is located in front of the rotating shaft 2 and is supported by the two frames 1A and 1B. The lower end portion of the vertical part 10A of the platen base plate 10 is divided in a fork shape and each branch extends between a pair of gum rollers 3, 3 adjacent to each other. Further, a transversal recessed portion 11 extending in the horizontal direction is formed on the surface of the central portion of the platen base plate 10, and a protruding wall 12 extending in the horizontal direction is disposed at the central portion of recessed portion 11. A plane plate shaped platen 13 made of gum, which is freely inserted in the recessed portion 11 stated above and whose rear surface is in contact with the protruding wall 12 is supported rotatably by the two frames 1A and 1B.

A carriage shaft 14 extending parallel to the axial direction of the forwarding rollers 9 is supported by the frames 1A and 1B and supported thereon is a carriage 15 movable along the axial direction of the carriage shaft 14. Further, a driven gear 17 and a driving gear 18 are supported rotatably near each end of carriage shaft on a printer base plate 16 adjacent the frames 1A and 1B, and a timing belt 19, which is attached to the carriage 15, is trained over driven gear 17 and driving gear 18. In addition, a driving motor 20 driving the driving gear 18 is disposed on the printer base plate 16 adjacent the driving gear 18. The driving force of this driving motor 20 is transferred to the driving gear 18 after being reduced so that the carriage 15 can move forward and backward along the carriage shaft 14 by the drive of driving gear 18 through the movement of the timing belt 19.

A thermal head mounting table 21, is mounted on carriage 15 opposite the platen 13. A thermal head 22, which is located on thermal head mounting table 21, is mounted so that it can be moved into contact with or moved away from the platen 13. This thermal head 22 is provided with a plurality of heat producing elements arranged at predetermined positions which are heated selectively according to printing information inputted through a keyboard (not shown). Further, a cassette stage portion 24, on which a ribbon cassette 23 is located, is located on the carriage 15 so that the intermediate portion of the ribbon drawn out from the ribbon cassette 23 is positioned between the platen 13 and the thermal head 22. In addition, in order that thermal head 22 is pressed against and separated from platen 13, a motor 25 for moving the thermal head mounting table 21 and at the same time for winding the ink ribbon around a take-up reel in the ribbon cassette 23 is mounted on the carriage 15. In addition, on the carriage 15 near the thermal head mounting table 21 is disposed movably a correction pin 26 capable of being brought into contact with and separated from the platen 13 next to and on the left side of the thermal head 22.

Figure 1:
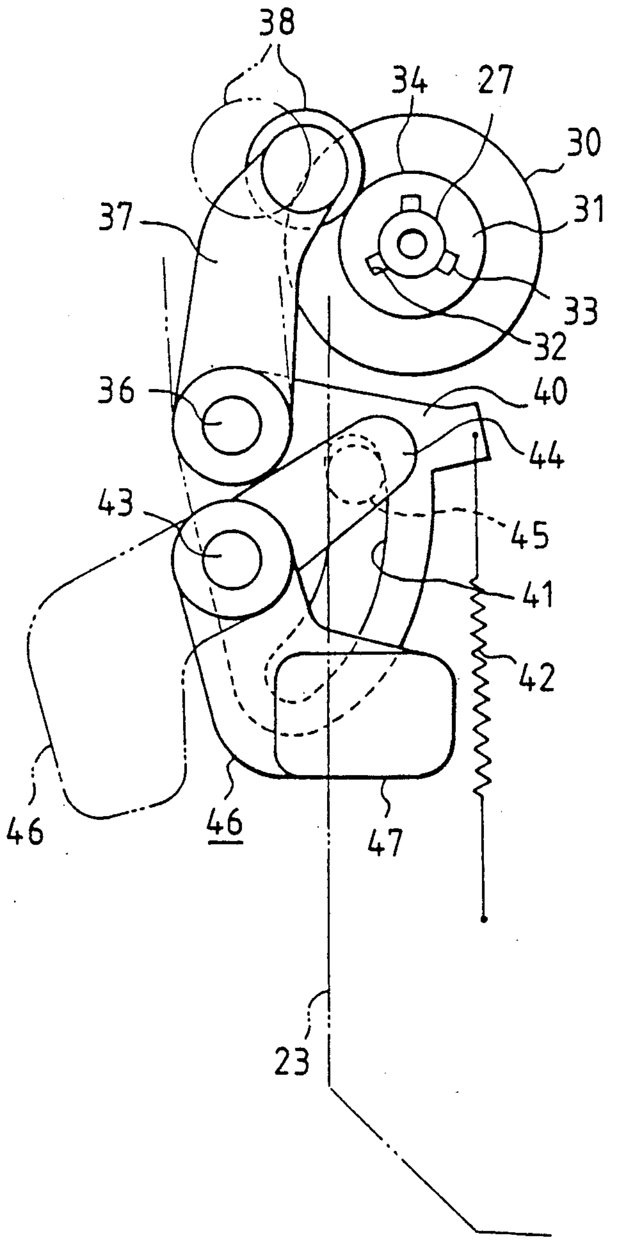
FIG. 1 is a plan view illustrating a constant tension device according to this invention.
Figure 2:
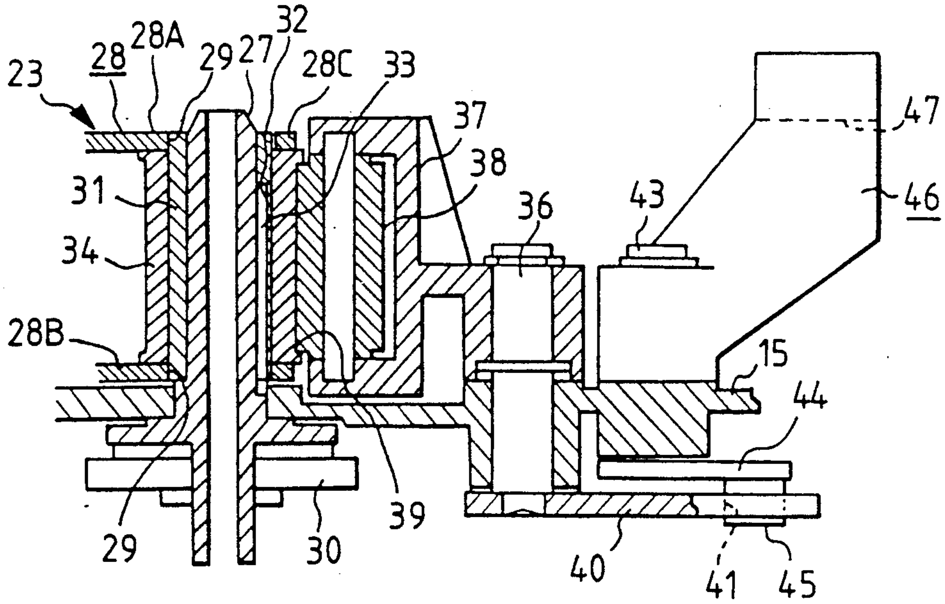
FIG. 2 is a longitudinal cross-sectional view of the device indicated in FIG. 1.
Figure 6:
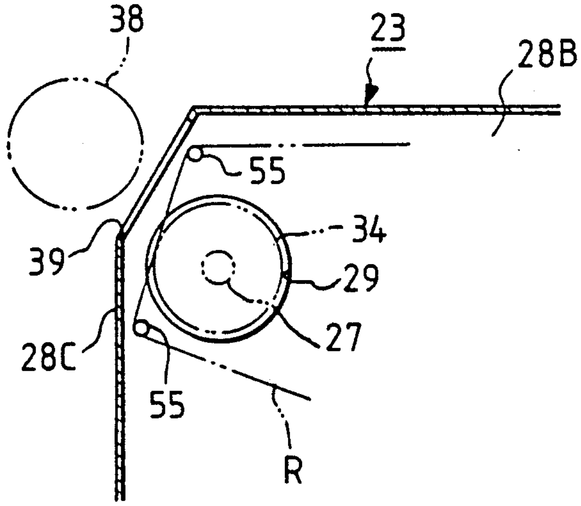
FIG. 6 is a plan view of the principal part of a ribbon cassette to which one embodiment of this invention applies.

As shown in FIGS. 1, 2 and 6, a vertical roller shaft 27 is supported rotatably on carriage 15 on the left end of carriage 15. FIG. 2 shows that roller shaft 27 is inserted into openings 29 formed coaxially at corner portions of the upper wall 28A and the lower wall 28B of the casing 28 of the ribbon cassette 23. Roller shaft 27 extends below the carriage 15 and on the part of this roller shaft 27 below carriage 15 is mounted a gear 30, which is connected with the motor 25 through a series of special gears (not shown) and is driven by motor 25. Further, within the casing 28 of the ribbon cassette 23 is disposed a sleeve 31 supported rotatably in the upper wall 28A and the lower wall 28B. A plurality of key grooves 32, 32, . . . are spaced with a certain interval in the vertical direction on the inner surface of sleeve 31. On the outer surface of the roller shaft 27 are disposed a plurality of keys 33, 33, . . . protruding therefrom, each of which can be inserted into each of the key grooves 32 so that the sleeve 21 is rotated together with the roller shaft 27 by engaging the sleeve 31 with the roller shaft 27.

On the outer periphery of the sleeve 31 is mounted a pinch roller 34, whose surface portion is made of a material having a relatively high friction coefficient, so that the ink ribbon (not shown) is forwarded to the take-up reel 35 along a portion of the outer periphery of pinch roller 34. Further, a first rotating shaft 36, extending vertically, is supported rotatably on the carriage 15 near the roller shaft 27 so as not to hinder the loading of the ribbon cassette 23 on the cassette stage portion 24. Affixed to the upper portion of first rotating shaft 36 is mounted a bracket 37 such that bracket 37 and first rotating shaft 36 rotate together. A thrusting roller 38 opposed to the pinch roller 34 is supported rotatably on this bracket 37 and is positioned so that it can extend into the interior of the casing 28 through an opening 39 formed in a side wall 28C of the casing 28 so as to contact the pinch roller 34.

A cam plate 40, which is affixed to and can rotate together with the first rotating shaft 36, and has an arc-shaped cam groove 41 formed thereon. Between cam plate 40 and the carriage 15 is mounted a helical spring 42 pulling this cam plate 40 in the clockwise direction, as shown in FIG. 1. As the cam plate 40 is rotated in the clockwise direction, the thrusting roller 38 is thrusted onto the pinch roller 34. A second rotating shaft 43, parallel to first rotating shaft 36, is also supported rotatably on the carriage 15 adjacent to the first rotating shaft 36. A lever 44 is rigidly attached to the lower end portion of this second rotating shaft 43 so that lever 44 rotates together with second rotating shaft 43. A pin 45, which slides in the cam groove 41 formed in the cam plate 40 when second rotating shift 43 is turned, is disposed on the lower end of lever 44. When lever 44 is rotated counterclockwise, the pin 45 slides in the cam groove 41 until in reaches the end of the cam groove 41 closest to the first rotating shaft 36. In this position, the cam plate 40 is rotated in its furthest clockwise position and the thrusting roller 38 is in contact with the ribbon trained over pinch roller 34. When lever 44 is rotated clockwise, the pin 45 slides in the cam groove 41, forcing the cam plate 40 to rotate in the counterclockwise direction, a against the pull of the helical spring 42. Because first rotating shaft 36 is rigidly connected to the cam plate 40, it also is rotated with the cam plate 40 in the counterclockwise direction. As first rotating shaft 36 is rotated counterclockwise, the thrusting roller 38 is forced away from the pinch roller 34.

Rigidly attached to upper end of second rotating shaft 43 is a taking-out preventing lever 46 such that when second rotating shaft 43 is rotated, both taking-out preventing lever 46 and lever 44 are rotated. Located on taking-out preventing level 46 is a stopper 47. The stopper 47 is configured to hold the cassette 23 onto the cassette stage portion during printing or correcting operations (when the cam plate 40 is rotated to its furthest clockwise position), and to rotate away from the cassette 23 when the cassette 23 is being removed or loaded.

As shown in FIGS. 3 and 4, supporting levers 48A and 48B, each of which is chevron-shaped, are mounted coaxially pivotably on the outer sides of the two frames 1A and 1B, located above and on the carriage 15 side of the axis of the rotating shaft 2. Between the two supporting levers 48A and 48B there is supported a guide bar 49 extending parallel to the rotating shaft 2. As indicted in detail in FIG. 4, this guide bar 49 is constructed to pivot between a raised position approximately right above the thermal head mounting table 21 where it contacts the sheet of paper protruding upward from the platen 13 in order to guide the sheet of paper so that the printed surface thereof is turned upward, and a lowered position in which it rests on the ribbon cassette 23 so as not to contact the sheet of paper protruding upward from the platen 13. Further, guide bar 49 is so constructed that it can be held stably in the raised and lowered positions by holding means such as a clip stop (not shown) disposed between the supporting levers 48A and 48B. Further, an operating protrusion 50 for rotating the guide bar 49 is disposed on supporting lever 48B.

As shown in FIG. 4, a cylindrical cam follower 51, extending parallel to the rotating shaft 2 is located on the outside of and extending away from frame 1B and is rigidly attached to lever 8. Located on the end portion of the rotating shaft 2 is disposed rotatably a cam lever 52 for rotating a holder 6 so as to move between a closed position, where movable guide member 5 is close to gum rollers 3 by the fact that it rotates until the cam surface 53 reaches the lowest position, and an open position, where movable guide member 5 is substantially they are separated from the gum rollers 3. Further an operating protrusion 54 for rotating cam lever 52 is disposed at the upper end of the cam lever 52, protruding therefrom.

The operation of the embodiment described above will be explained below.

In order to locate the ribbon cassette 23 on the cassette stage portion 24 of the carriage 15, the pin 45 of the lever 44 in positioned at the end portion in the clockwise direction of the reverse cam groove 41 of the cam plate 40 in FIG. 1 and the stopper 47 of the taking-out preventing lever 46 is positioned at a remote position as indicated by a dashed line. At the same time the thrusting roller 38 is positioned at a remote position indicated by a dashed line in FIG. 1. In such a state, when the ribbon cassette 23 is loaded on the cassette stage portion 24, the intermediate portion of ink ribbon, exposed on the front side of the ribbon cassette 23, is positioned between the platen and the thermal head 22. When the cassette 23 is loaded on the cassette stage portion 24, the roller shaft 27 is inserted into the sleeve 31 through the opening 29 formed in the lower wall 28B of the ribbon cassette 23. When the roller shaft 27 is inserted into sleeve 31, the sleeve 31 can be rotated together with the roller shaft 27 because each of the keys 33 of the roller shaft 27 is meshed with each of the key grooves 32. Once the cassette 23 is loaded properly on cassette stage portion 24, the taking-out preventing lever 46 is manually rotated counterclockwise and the stopper 47 is rotated to a position above the ribbon cassette 23, thereby securing the ribbon cassette 23 against cassette stage portion 24. Further, when taking-out preventing lever 46 is rotated counterclockwise, lever 44 is rotated counterclockwise and the pin 45 slides in and reaches the end portion of the reverse cam groove 41, causing the cam plate 40 to rotate clockwise. When the cam plate 40 is rotated clockwise, the thrusting roller 38 is moved into the interior of the casing 28 of the ribbon cassette 23 through the side wall 28C of the casing 28 so as to press against the ribbon which is in contact with pinch roller 34 and to thereby provide added friction to prevent the ribbon from sliding along the pinch roller 34.

In order to position the sheet of paper, the two supporting levers 48A and 48B are rotated to positions indicated by dashed lines in FIG. 4 by manually manipulating the operating protrusion 50 so that the guide bar 49 is positioned above the ribbon cassette 23. At the same time, each of the forwarding rollers 9 is separated from the gum roller 3 by manually manipulating the operating protrusion 54 on cam lever 52 so that the lever 8 is rotated counterclockwise against the elastic force of the spring 7. In this state, the sheet of paper (not shown) is inserted between the gum roller 3 and the movable guide member 5 along the fixed guide plate 4 and positioned so that the leading edge of the sheet of paper protrudes in front of and above the platen 13. Because the guide bar 27 is located at a position away from gum rollers 3 where it is not in contact with the sheet of paper, it is possible to easily position the sheet of paper.

Once the positioning of the sheet of paper has been completed in the manner described above, the two supporting lever 48A and 48B are rotated to the positions indicated by solid lines in FIG. 4 by manually manipulating the operating protrusion 50 so that the guide bar 49 is moved to a position close to the carriage 15. At the same time, the cam lever 52 is rotated clockwise by manually manipulating the operating protrusion 54 thereby rotating the lever 8 so that the forwarding rollers 9 are pressed against the paper and the gum rollers 3 by the elastic force of the spring 7. Then, since the sheet of paper is held between the gum roller 3 and the forwarding rollers 9, it is possible to forward the sheet of paper by activating the motor (not shown) used to rotate the gum roller 3.

When printing information is inputted through the keyboard (not shown) electric current is made flow in the form of a pulse through the motor 25 mounted on the carriage 15 for every input of the printing information. In response to each pulse, the motor 25 drives the thermal head mounting table 21 forward, causing the thermal head 22 to be pressed against the platen, thereby squeezing together the ink ribbon and the sheet of paper. At this time, since the platen 13 is rotatable around a horizontal axis, it adjusts to be flush against the thermal head. When the thermal head 22 is pressed against the ink ribbon, the heat producing elements in the thermal head 22 are activated selectively, depending upon the printed character desired, and the ink at the location where the ink ribbon is in contact with the heat producing elements is melted and transferred to the sheet of paper producing the desired character. Next, current in the form of a pulse is made to flow by the driving motor 20 and the carriage 15 is moved by the movement of the timing belt 19, corresponding to one letter spacing along the carriage shaft 14 so as to be positioned in front of the place on the paper corresponding to the succeeding desired character. The thermal head mounting table 21 is driven so as to be rotated toward and away from the platen in synchronism with this movement of the carriage 15. This rotational drive of the motor 25 is transferred to the roller shaft 27 through a series of special gears (not shown) and to the pinch roller 34 which is rotated with a constant speed so that the ink ribbon, which has just passed through the thermal head 22, is stretched and peeled away from the sheet of paper. This ink ribbon, which has been peeled off from the sheet of paper, is rewound by the take-up reel 35.

Since the thermal transfer printer is of typewriter specification, the thermal head 22 is separated from the platen 13 principally for every input. In the case where the input is effected with a high speed such as when the printer is fed information from a computer, the thermal head 22 is held against the platen 13.

Printing is effected, as described above, corresponding to the printing information inputted through the keyboard. When printing for one line is terminated, the carriage 15 is returned along the carriage shaft 14 by the drive in the reverse direction of the driving motor 20 during which the thermal head 22 is positioned away from the platen 13. At this time the rotating shaft 2 is rotated by the drive of the motor (not shown) so that the sheet of paper is forwarded a distance of one line. Then, printing on the succeeding line is effected by inputting newly corresponding printing information through the keyboard. The part of the sheet of paper protruding above the platen becomes longer as the printing continues in this way. However, as the protruding length of the sheet of paper grows long, it remains stable because the sheet of paper is guided by the guide bar 49.

In order to remove the ribbon cassette 23 from the cassette stage portion 24 of the carriage 15, the taking-out preventing lever 46 is rotated clockwise to the position indicated by the dashed line in FIG. 1 so that the stopper 47 is located at the remote position. At the same time the lever 44 is rotated in the same direction in synchronism with the rotation of the taking-out preventing lever 46. In this way, the position of the reverse cam groove 41 formed in the cam plate 40, in which the pin 45 is inserted, is varied and the cam plate 40 and the bracket 37 are rotated counterclockwise (as viewed in FIG. 1) so that the thrusting roller 38 is pulled away from the pinch roller 34 and the ribbon cassette 23. This allows the ribbon cassette 23 to be removed.

In order to perform the correction operation to erase the ink making up a printed character on the sheet of paper a ribbon cassette containing correction ribbon is loaded on the cassette stage portion 24 of the carriage 15 in the same way as the ink ribbon. The taking-out preventing lever 46 is then rotated so that the ribbon cassette 23 is held by the stopper 47. At the same time, the thrusting roller 38 is pressed against the correction ribbon trained over the pinch roller 34 and the sheet of paper and the carriage 15 are aligned so that the printed character to be erased is opposite to the thermal head 22. Thereafter, the motor 25 mounted on the carriage 15 is driven so that the thermal head 22 and the correct pin 26 are pressed against the platen 13, thereby squeezing together the ink ribbon and the sheet of paper. The ink of the printed character to be erased is then melted by heating the corresponding heat producing elements in the thermal head 22. When the carriage 15 is moved, the correction ribbon in contact with ink in the melted state is displaced to the side of the thermal head 22, thus remaining in contact with the sheet of paper. The correction pin 26 is thrusted against the correction ribbon and the sheet of paper, pressing them against the platen 13. The ink in the melted state is held between the sheet of paper and the correction ribbon by the correction pin 26 and allowed to cool and solidify. When the ink is cooled and solidifies, the affinity of the ink with the correction ribbon becomes stronger than with the sheet of paper. Therefore, when the correction pin 26 is withdrawn, the solidified ink is reliably transferred to the correction ribbon as a result of the correction ribbon first being stretched and then peeled away from the sheet of paper by the constant tension produced by pinch roller 34.

During correction, since the peeling away of the correction ribbon from the sheet of paper is effected when the ink is solidified, a stronger force is required for the peeling away of the correction ribbon than that required during printing, during which the ink ribbon is peeled away from the sheet of paper when the ink is in a melted state. However, since peeling away the correction ribbon is effected by means of the pinch roller 34 which provides a constant tensile force and constant ribbon feed rate, regardless of the amount of ribbon collected on the take-up reel, it is possible to more reliably peel away the correction ribbon than with any prior device in which peeling away the ribbon is effected by the rotation of the tale-up reel 35 alone. Furthermore, according to this embodiment, since the outer peripheral surface portion of pinch roller 34 is made of a material having a relatively high friction coefficient, it is possible to more stably peel off the correction ribbon from the sheet of paper without the ribbon slipping along the take-up reel.

As described above, according to this invention, since peeling away the correction ribbon from the sheet of paper is effected by stretching the correction ribbon, which is put between the pinch roller 34, which pulls the ribbon at a constant feed rate, and the thrusting roller 38, a strong constant tensile force is provided for reliably peeling away the correction ribbon. Further, since the inadvertent removal of the ribbon cassette 23 is prevented by the taking-out preventing lever 46, it is possible to prevent ribbon cassette from rising from the cassette stage portion 24 of the carriage 15 because of vibrations produced by the movement of the carriage 15.

In addition, this invention may be used to improve the detection of the color of ink in certain color-ink-ribbon thermal transfer printers by providing a constant tension along the color ink ribbon and a constant feed-rate of color ink ribbon in front of the color detection means. Feeding the color ink ribbon at a fixed distance from the detection means and at a fixed rate, without regard to the amount of ribbon on the take-up reel, causes the detection means to be less prone to error.

This invention is not restricted to the embodiment described above, but various sorts of modifications are possible.

For example, as shown in FIG. 6, the pinch roller 34 may be mounted directly on the roller shaft 27 and the ribbon cassette may be constructed so that the pinch roller 34 enters the interior of the casing 28 of the ribbon cassette 23 through an opening formed in the lower wall 28B. Even in such a construction the thrusting roller 38 may be constructed similarly to that in the embodiment described above. In this case, it may be necessary to dispose a plurality of guide pins 55, 55 guiding the ink ribbon R in the casing 28 of the ribbon cassette 23 near the pinch roller 34 so that the ink ribbon is in contact with the surface of the pinch roller 34.

Additionally, the embodiment described above is written in terms of separate ribbon cassette for the correction ribbon and the ink ribbon. It should be noted that ribbon cassettes also house both correction and ink ribbon, or a single ribbon with both correction and printing capabilities. This invention may be easily modified to be used with various ribbon cassette configurations.

Furthermore, this invention can be applied also to general thermal transfer printers, in which no correct operation is effected.

As explained above, according to this invention, since the ink ribbon is peeled away from the sheet of paper by positioning the exposed portion of the ink or correction ribbon between a pinch roller, which is positively driven, and the thrusting roller so as to stretch the ink ribbon, it is possible to reliably peel away the ink or correction ribbon from the sheet of paper and thus a practical solution to the problems associated with prior art correction devices for thermal transfer printers can be obtained.

We claim:

1. A thermal transfer printer having a platen, a carriage reciprocatingly movable along said platen, a thermal head carried by said carriage and movable into and out of contact with said platen, and a ribbon cassette carried by said carriage and accommodating an ink ribbon a part of which is positioned between a printing medium on said platen and said thermal head, said thermal transfer printer comprising:

- a first roller rotatably mounted disposed in said ribbon cassette for separating said ink ribbon from said printing medium;
- first roller driving means carried by said carriage and rotatingly driving said first roller; and
- a second roller provided on said carriage and capable of cooperating with said first roller in pinching said ink ribbon so as to tense said ink ribbon, said second roller being adapted to be moved through an opening provided in said ribbon cassette into pressure contact with said first roller.

2. A thermal transfer printer according to claim 1, further comprising a lever provided on said carriage for preventing detaching of said ribbon cassette.

3. A thermal transfer printer having a platen, a carriage reciprocatingly movable along said platen, a thermal head carried by said carriage and movable into and out of contact with said platen, and a ribbon cassette carried by said carriage and accommodating an ink ribbon a part of which is positioned between a printing medium on said platen and said thermal head, said thermal transfer printer comprising:

a first roller rotatably mounted for separating said ink ribbon from said printing medium; said first roller being adapted to be inserted into said ribbon cassette through a first opening provided in said ribbon cassette; and a second roller provided on said carriage and of cooperating with said first roller in pinching said ink ribbon so as to tense said ink ribbon, said second roller being adapted to be moved through a second opening provided in said ribbon cassette into pressure contact with said first roller.

4. A thermal transfer printer according to claim 3, further comprising a lever provided on said carriage for preventing detaching of said ribbon cassette.

5. A ribbon cassette for use in a thermal transfer printer and accommodating an ink ribbon a part of which is led out of a casing so as to be positioned between a printing medium on a platen of said printer and a thermal head of said printer, said ribbon cassette comprising:

a pinch roller rotatably disposed in said casing and having an engaging portion for torque-transmitting engagement with a pinch roller drive mechanism which is carried by a carriage of said printer, said ribbon cassette also being carried by said carriage, a casing having a side wall in which is formed an opening through which a pressing roller capable of making a pressure contact with said pinch roller is exposed to an interior of said casing.

6. A ribbon cassette according to claim 5, wherein said ink ribbon performs both printing and erasion.

7. A ribbon cassette for use in a thermal transfer printer and accommodating an ink ribbon a part of which is led out of a casing so as to be positioned between a printing medium on a platen of said printer and a thermal head of said printer, wherein the improvement comprises that a bottom opening is formed in the bottom wall of said casing such that a pinch roller, which stands upright on a cassette-mounting portion of a carriage of said printer carrying said ribbon cassette, is exposed to an interior of said casing through said bottom opening, that a side opening is formed in a side wall of said casing through which a pressing roller capable of making a pressure contact with said pinch roller is exposed to the interior of said casing, and that a guide pin for guiding an ink ribbon is provided inside said casing at a position near said bottom opening.

8. A ribbon cassette according to claim 7, wherein said ink ribbon performs both printing and erasion.

* * * * *

UNITED STATES PATENT AND TRADEMARK OFFICE
CERTIFICATE OF CORRECTION

PATENT NO. : 5,030,967

DATED : July 9, 1991

INVENTOR(S) : Inoue et al.

It is certified that error appears in the above-identified patent and that said Letters Patent is hereby corrected as shown below:

Column 10, line 53, Claim 1 delete "and" and insert --for--.

Column 10, line 55-56, Claim 1 delete "capable of".

Signed and Sealed this

Twenty-ninth Day of December, 1992

*Attest:*

DOUGLAS B. COMER

*Attesting Officer*

*Acting Commissioner of Patents and Trademarks*